(12) United States Patent
Elian et al.

(10) Patent No.: US 10,543,722 B2
(45) Date of Patent: Jan. 28, 2020

(54) FLEXIBLE TIRE SENSOR DEVICE AND METHOD

(71) Applicant: Infineon Technologies AG, Neubiberg (DE)

(72) Inventors: Klaus Elian, Alteglofsheim (DE); Thomas Mueller, Lappersdorf (DE)

(73) Assignee: Infineon Technologies AG, Neubiberg (DE)

( * ) Notice: Subject to any disclaimer, the term of this patent is extended or adjusted under 35 U.S.C. 154(b) by 144 days.

(21) Appl. No.: 15/911,305

(22) Filed: Mar. 5, 2018

(65) Prior Publication Data

US 2018/0257442 A1    Sep. 13, 2018

(30) Foreign Application Priority Data

Mar. 7, 2017    (DE) .................. 10 2017 104 732

(51) Int. Cl.
*B60C 23/04*    (2006.01)
*G01L 17/00*    (2006.01)

(52) U.S. Cl.
CPC ...... *B60C 23/0486* (2013.01); *B60C 23/0493* (2013.01); *G01L 17/00* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433;
(Continued)

(56) References Cited

U.S. PATENT DOCUMENTS 6,823,728 B1 * 11/2004 Barnes ............... G01L 17/005
73/146
2004/0155764 A1    8/2004 Ichinose
(Continued)

FOREIGN PATENT DOCUMENTS

DE    10116743 A1    10/2002
DE    10240446 A1    3/2004
(Continued)

OTHER PUBLICATIONS

German Patent Office, Office Action issued for DE 102017104732.8 dated Aug. 22, 2017, 8 pages.

*Primary Examiner* — Andre J Allen
(74) *Attorney, Agent, or Firm* — Schiff Hardin LLP (57) ABSTRACT

Tire sensor devices, tires equipped with such devices and corresponding methods are disclosed, where a tire sensor chip is provided on a flexible sheet material.

16 Claims, 5 Drawing Sheets

(58) Field of Classification Search
CPC ............ B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28

USPC .................................................. 73/146–146.8
See application file for complete search history.

(56) References Cited

U.S. PATENT DOCUMENTS

| 2006/0081042 | A1* | 4/2006 | Silverbrook ........ B60C 23/0408 73/146 |
| 2011/0095891 | A1 | 4/2011 | Fenkanyn |
| 2015/0020585 | A1* | 1/2015 | Dussinger ........... B60C 23/0411 73/146.5 |
| 2017/0234745 | A1* | 8/2017 | Choi ........................ G01L 1/18 73/146.3 |

FOREIGN PATENT DOCUMENTS

| DE | 102007007016 A1 | 10/2007 | |
| DE | 102012007071 A1 | 10/2013 | |
| EP | 1970223 B1 | 7/2010 | |
| WO | WO-2016024850 A1 * | 2/2016 | .............. G01M 3/16 |

* cited by examiner

FLEXIBLE TIRE SENSOR DEVICE AND METHOD

TECHNICAL FIELD

The present application relates to tire sensor devices, tires equipped with such devices and methods for manufacturing such devices.

BACKGROUND

Tire sensor devices are mounted to tires for example of cars or other vehicles to measure quantities associated with the tire, in particular a gas (air) pressure inside the tire. Such sensor devices may for example be used in tire pressure monitoring systems (TPMS) to continually monitor the pressure inside the tire. Such sensor devices may for example be mounted to a valve of the tire or be mounted inside the tire and transmit signals corresponding to the measured quantity in a wireless manner to further circuits, for example an electronic control unit or other circuits provided within the car, where the signals are evaluated further. In case of a pressure measurement, for example a warning may be output to a driver of the car in case the pressure is below a predetermined threshold and/or in case different tires have different pressures.

In many conventional approaches, such tire sensor devices are comparatively costly to manufacture, requiring for example different molding steps to provide housings/packages to a sensor chip. Therefore, cost efficient solutions are highly desirable for such sensor devices.

SUMMARY

A tire sensor device as defined in claim 1 and a method as defined in claim 14 are provided. The dependent claims define further embodiments as well as a tire including such a sensor device.

According to an embodiment, a tire sensor device is provided, comprising:
a flexible sheet, wherein conductive paths are formed on the flexible sheet,
a tire sensor chip mounted to the flexible sheet and electrically coupled to at least one of the conductive paths, and
an energy supply to electrically supply the tire sensor chip with energy.

According to another embodiment, a tire is provided, comprising:
a tire sensor device as mentioned above mounted inside the tire.

According to a further embodiment, a method is provided, comprising:
providing a flexible sheet with conductive paths thereon,
providing a tire sensor chip on the sheet electrically coupled to the conductive paths, and
providing an energy supply electrically coupled to the conductive paths.

The above summary is merely intended to give a brief overview over some embodiments and is not to be construed as limiting, as other embodiments may employ other features.

DETAILED DESCRIPTION

In the following, various embodiments will be discussed referring to the attached drawings. It should be noted that these embodiments are given as illustrative examples only and are not to be construed as limiting. For example, while embodiments may be described as comprising a plurality of features or elements, this is not to be construed as indicating that all these features or elements are necessary for an implementation. Instead, in other embodiments, some of these features or elements may be omitted, and/or may be replaced by alternative features or elements. In addition to the features or elements explicitly shown in the drawings or described herein, other features or elements, for example features or elements used in conventional tire sensor devices and tire pressure monitoring systems, may be provided.

Features from different embodiments may be combined unless noted otherwise. For example, some possible components of tire sensor devices like a flexible sheet battery or a coil are only described with respect to some of the embodiments, but may also be provided in other embodiments. Variations and modifications described with respect to one of the embodiments may also be applicable to other embodiments.

Figure 1:
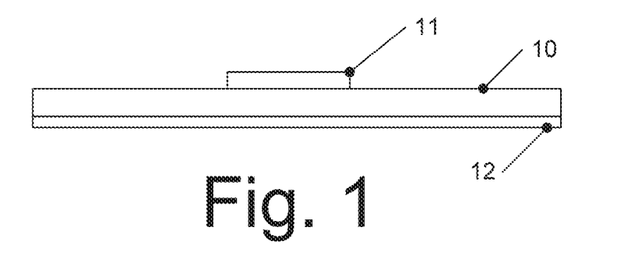
FIG. 1 is a schematic cross-sectional view of a tire sensor device according to an embodiment.

Turning now to the figures, FIG. 1 illustrates a tire sensor device according to an embodiment. The tire sensor device of FIG. 1 is built on a flexible sheet material 10, which may be made of a suitable plastic material like polyethylene terephtalate (PET). Electrically conductive paths, e.g. made of a metal like silver or a metal alloy, may be provided on sheet material 10 to provide electrical connections. On sheet material 10, a sensor circuit 11 is provided to sense a desired quantity within the tire. In particular, sensor circuit 11 may comprise a pressure sensor to measure a tire pressure. Further examples for sensors that may be included in sensor circuit 11 include acceleration sensors, magnetic field sensors or temperature sensors.

On a side of sheet 10 opposite sensor circuit 11, an adhesion layer 12 is provided. In other embodiments, sheet 10 itself may be usable for adhesion, in which case adhesion layer 12 may be omitted. In embodiments, adhesion layer 12 and/or 10 is made of a vulcanizable material, for example a rubber material, to be adhered to a rubber material of a tire by vulcanization. However, other adhesives may also be used.

While not shown in FIG. 1, but as will be explained further below referring to further embodiments, further components may be provided on sheet 10, for example an energy supply like a sheet battery, a capacitor and/or an energy harvesting device like a coil which generates energy by induction when a tire to which the sensor device is mounted moves. For example, such induction may be caused by the earth magnetic field or by magnets provided stationary relative to the tire. Examples for such additional components will be explained later in greater detail.

Sheet material 10 may have a size greater than 4 cm² (for example greater than 2×2 cm) or more, 10 cm² or more or even up to 100 cm² (for example 10×10 cm), but is not limited to these sizes. With such sizes, for example comparatively large coil structures, antenna structures or battery structures may be provided. In contrast to some other electronic applications where increasing miniaturization is required, space requirements within a tire are relaxed, such that comparatively large area structures may be provided. By providing such large area structures on a flexible sheet 10, comparatively low manufacturing costs may be obtained.

Figure 2A:
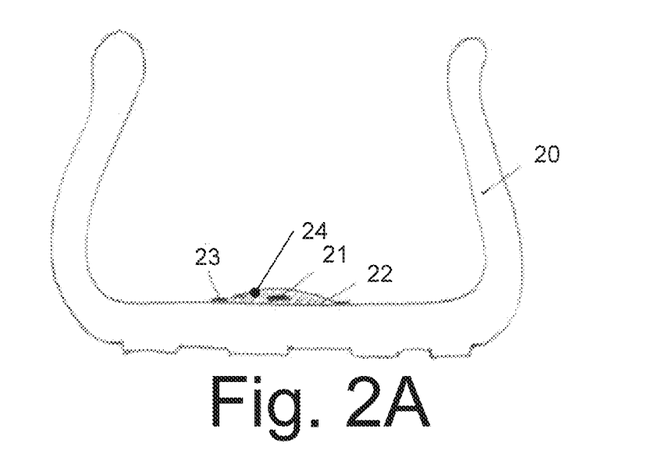
FIG. 2A is a cross-sectional view of a tire sensor device according to an embodiment mounted inside a tire.
Figure 2B:
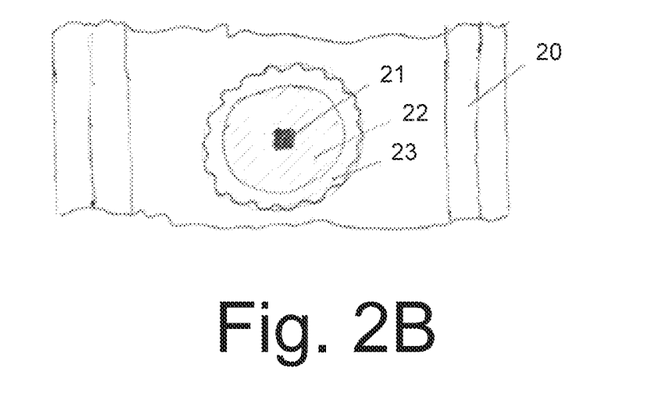
FIG. 2B is a plan view of the tire sensor device of FIG. 2A.

FIGS. 2A and 2B illustrate a further embodiment. FIG. 2A illustrates a cross-sectional view of a sensor device according to an embodiment mounted to a tire 20, and FIG. 2B illustrates a plan view thereof.

The tire sensor of FIGS. 2A and 2B comprises a sensor chip 21, which in the embodiment of FIGS. 2A and 2B is an unpackaged sensor chip, mounted to a flexible sheet 22, which as already explained with reference to FIG. 1 may have conductive paths thereon, for example by vapor deposition or printing of a metal like silver on the sheet, to electrically contact sensor chip 21 and possible other components provided on flexible sheet 22.

Flexible sheet 22 is mounted to tire 20 using a vulcanization based adhesive 23. Moreover, in some embodiments, some protective material 24 may be provided on sheet 22 enclosing chip 21 to provide mechanical protection. This material 24 may in particular be a flexible material.

Figure 3:
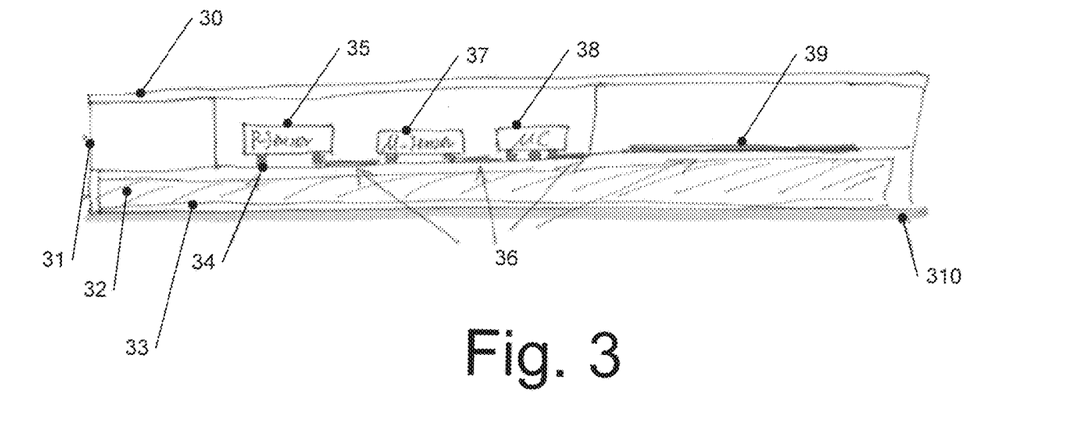
FIG. 3 is cross-sectional view of a tire sensor device according to an embodiment.

FIG. 3 is a cross-sectional view of a sensor device according to a further embodiment. The sensor device of FIG. 3 is based on a flexible sheet 33 including a flexible battery 32 as a flexible sheet carrier. In other words, in the embodiment of FIG. 3, sheet 33 incorporates battery structures. Such a flexible battery may for example be provided by providing corresponding battery structures on a conductive foil, the foil serving as one of the electrodes of the battery, and corresponding battery structures printed or otherwise deposited thereon. Flexible battery 32 may be at least partially surrounded by a non-conducting flexible material of flexible sheet 33, for example PET or another suitable plastic material. Conductive paths 36, for example made of printed silver, may be provided on flexible sheet 33 to provide electrical connections to flexible battery 32 and to components 35, 37, 38 discussed in the following. Furthermore, conductive paths 36 may form a coil structure 39, which may serve as an antenna for wirelessly transmitting data measured by the sensor device and/or may serve as an energy harvester by induction caused when the tire together with the sensor device of FIG. 3 moves through an external magnetic field like the earth magnetic field or a magnetic field provided by stationary magnets.

Furthermore, the device of FIG. 3 comprises a pressure sensor chip 35, a magnetic field sensor chip 37 and a microcontroller 38, which all may be unpackaged chips (e.g. merely the chip dies). While separate chips are shown in FIG. 3, in other embodiments some or all of the functionalities (pressure sensing, magnetic field sensing, etc.) may be provided on a single chip. Components like sensor chips 35, 37 and microcontroller 38 may be coupled to conductive paths 36 via conductive studs or solder balls 34. Further sensors like acceleration sensors or temperature sensors may also be provided. Pressure sensor 35 may sense a pressure within a tire to which the sensor device of FIG. 3 is mounted (for example tire 20 of FIG. 2). Magnetic field sensor 37 may serve to measure a movement of the tire, for example rotational speed, using for example the changing orientation of the earth magnetic field when the tire rotates. Microcontroller 38 may receive signals from sensors 35, 37 and convert them into a suitable protocol for transmitting via coil structure 39 to some device in a vehicle the tire is mounted to for further evaluation.

The device of FIG. 3 further comprises a plastic support structure 31, for example plastic ridges or plastic columns, which may be glued or otherwise mounted to material 33. A protective flexible plastic sheet 30 is provided on support structure 31 to protect chips 35, 37, 38 and the conductive path 36 for example against dust. Other structures may also be used for protection, for example the structure shown in FIG. 2 with a flexible material surrounding the chips.

Figure 4A:
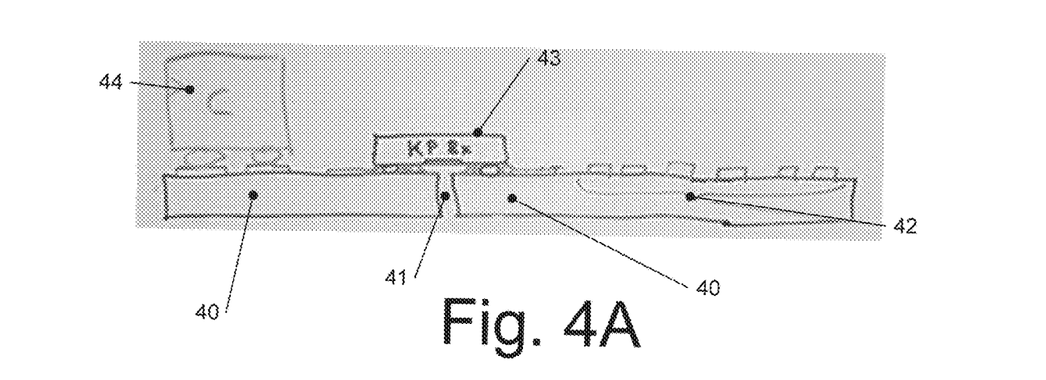
FIGS. 4A-4E are cross-sectional views of tire sensor devices according to various embodiments.
Figure 4B:
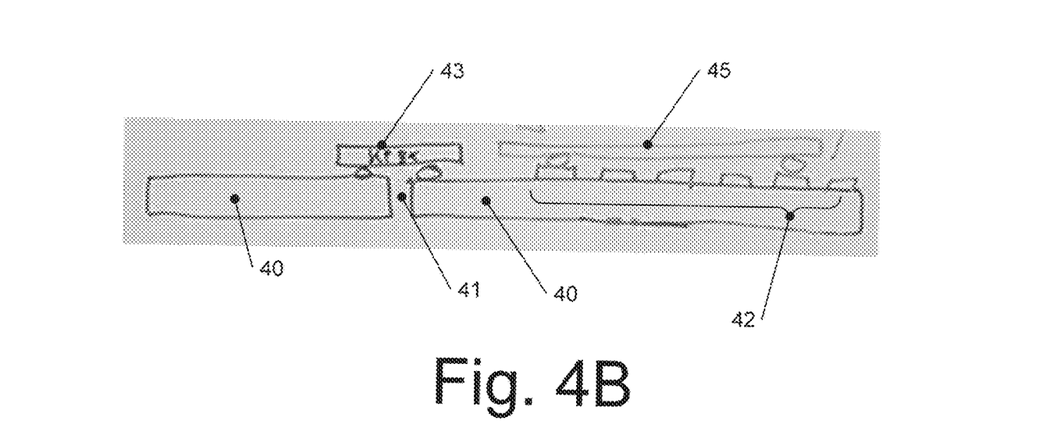

Further embodiments of tire sensor devices will be explained with reference to FIGS. 4A and 4B. FIGS. 4A to 4E illustrate various variations of tire sensor devices. In order to avoid repetitions, corresponding elements in different embodiments of FIGS. 4A to 4E bear the same reference numerals and will not be described several times.

The embodiment of FIG. 4A comprises a flexible sheet 40 with electrical conductive paths provided thereon, for example printed or deposited thereon, including a coil structure 42 serving as an antenna and/or an energy harvester, as already explained above. It should be noted that while for example in FIG. 3 a single coil structure 49 and FIG. 4A a single coil structure 42 is shown, in other embodiments, separate coil structures may be provided for energy harvesting and antenna purposes in other embodiments.

A pressure sensor 48 is provided on sheet 40 and coupled to conductive path for example by soldering. A gap or hole 41 in sheet 40 is provided at the location of pressure sensor chip 43 as shown, to provide an air inlet for pressure sensing.

Finally, a large capacitor 44 having a capacitance for example of the order of 1 nF to 1 μF, for example between 1 nF- and 500 nF is provided to store energy and provide energy to sensor 43. Capacitor 44 is therefore another example of an energy supply besides the sheet battery 32 discussed with reference to FIG. 3.

In operation, pressure sensor 43 is powered by energy from capacitor 44 to measure a tire pressure and to transmit correspondingly measured values using coil 42 as an antenna. It should be noted that pressure sensor 43 in some embodiments may also comprise further components and sensors like a temperature sensor, a magnetic field sensor or an acceleration sensor.

FIG. 4B is a variation of the embodiment of FIG. 4A, where instead of large capacitor 44 a sheet capacitor 45 is provided, which is mounted directly on coil structure 42 to receive energy therefrom.

Figure 4C:
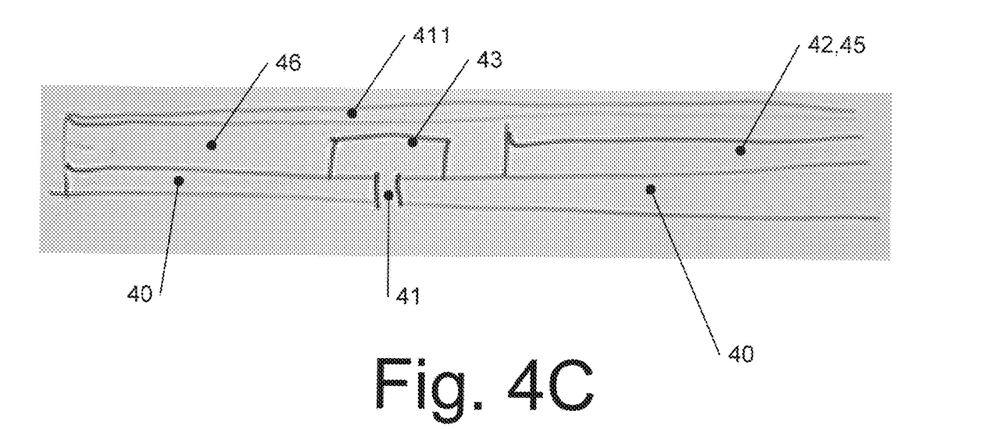

FIG. 4C illustrates the sensor device of FIG. 4A or 4B with an additional covering layer 46, which may be provided by a support structure as illustrated in FIG. 3 or by a flexible material as discussed with reference to FIG. 2, with a rubber layer 411 on top thereof. Using rubber layer 411, the sensor device may be mounted to a tire by vulcanization, such that gap 41 faces the interior of the tire to measure a pressure therein.

Figure 4D:
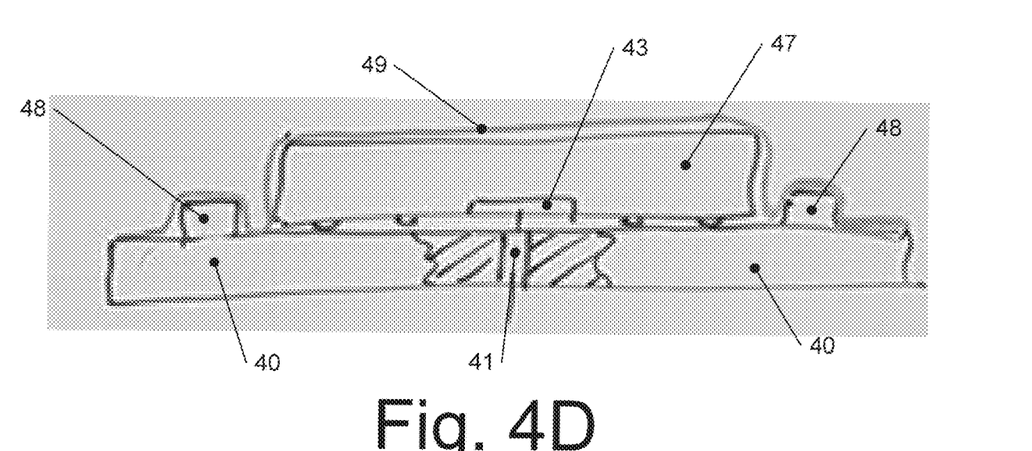

FIG. 4D illustrates an alternative covering, where sensor chip 43 is covered by a component 47, for example a capacitor structure, and further components 48, for example further sensor components, are also provided on sheet 40. These components are covered by a thin protective layer 49, which may also be vulcanizable in some embodiments to be mounted to a tire.

Figure 4E:
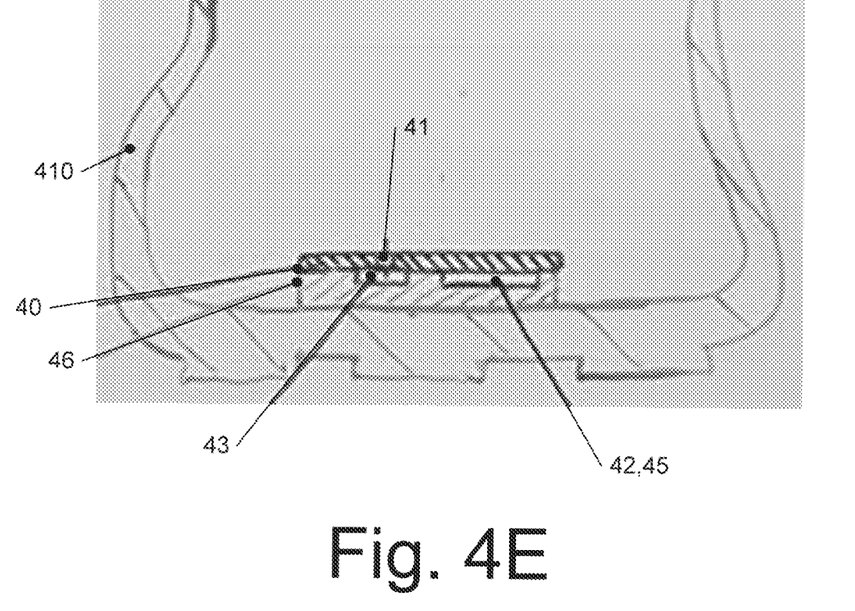

FIG. 4E illustrates the sensor devices discussed with reference to FIGS. 4A to 4D, in particular the sensor device of FIG. 4C, mounted inside a tire 410, such that gap 41 faces the interior of the tire. For example, in some embodiments, a vulcanization-based glue may be used for mounting.

Figure 5A:
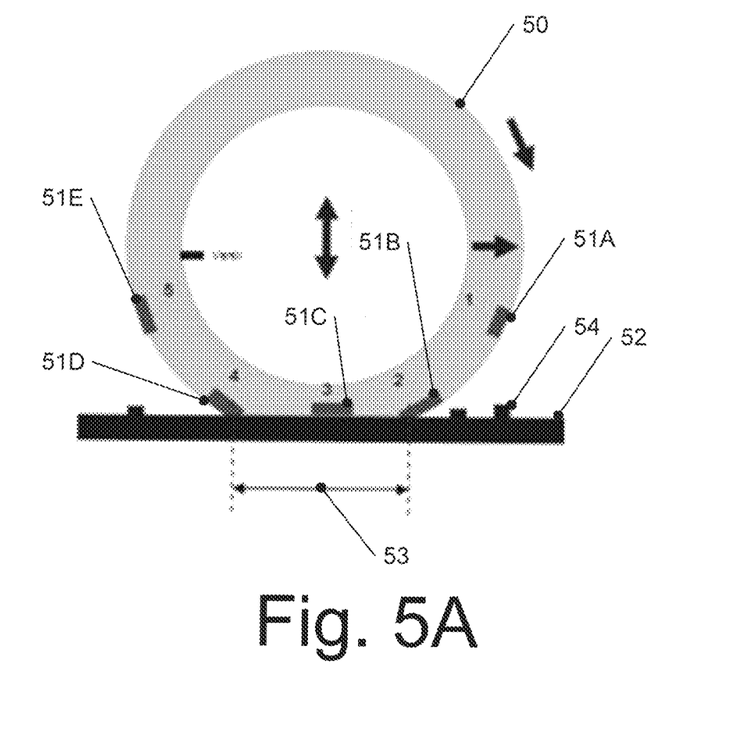
FIGS. 5A and 5B are explanatory diagrams illustrating the use of tire sensor devices for friction measurement and footprint measurement.
Figure 5B:
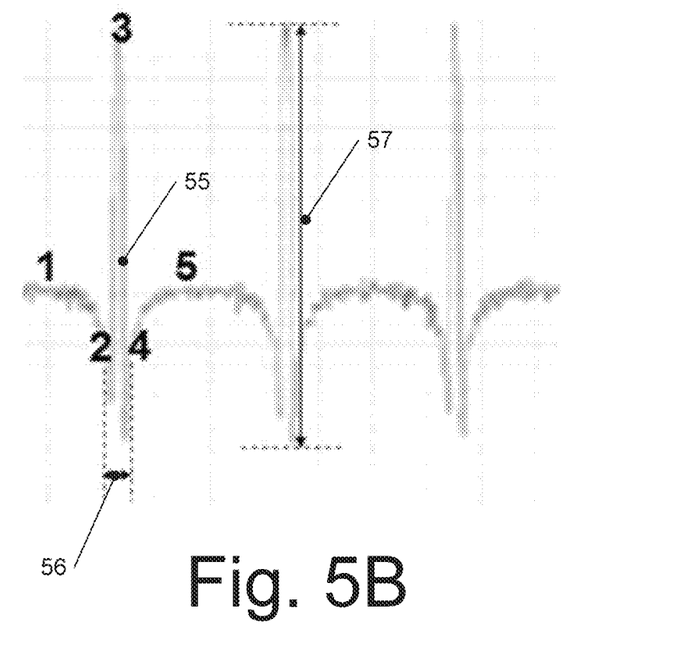

Besides sensing pressure, sensor devices as discussed above may also be used for performing other measurements in a tire. A corresponding example is shown in FIGS. 5A and 5B. FIG. 5A illustrates a sensor device according to an embodiment mounted to a tire, and FIG. 5B illustrates a corresponding measurement curve.

In particular, FIG. 5A illustrates a plurality of sensor devices 51A to 51D, which may each be designed as discussed above based on a flexible sheet with a sensor chip mounted thereon and including an energy supply and a coil for wireless transmission, mounted in a tire 50. In this case, sensor devices 51A to 51D may comprise acceleration sensors and/or strain sensors sensing an acceleration or strain on the flexible sheet of the sensor device and/or may comprise pressure sensors. Tire 50 is shown as rolling on ground 52, which may have roughnesses like stones 54 thereon. An arrow 53 indicates the width of a so-called footprint, i.e. an area where tire 50 contacts ground 52.

FIG. 5B illustrates an example acceleration signal 55 as may be obtained from each of sensor devices 51A to 51D when sensor devices 51A to 51D comprise acceleration sensors. Designations 1 to 5 in FIG. 5B illustrate example current measurement values from sensor devices 51A to 51D, respectively, for the position of tire 50 shown in FIG. 5A. As can be seen, when the respective sensor device is at or near the footprint 53, a corresponding peak results. A peak width 56 is directly proportional to the width of footprint 53. A peak height 57 depends on pressure, speed, height of stones like stone 54 and a friction between tire 50 and ground 52 (lower peak height with stronger friction). Therefore, information regarding friction and the roughness of ground 52 may be obtained in some embodiments by evaluating the peak height and peak width.

Figure 6:
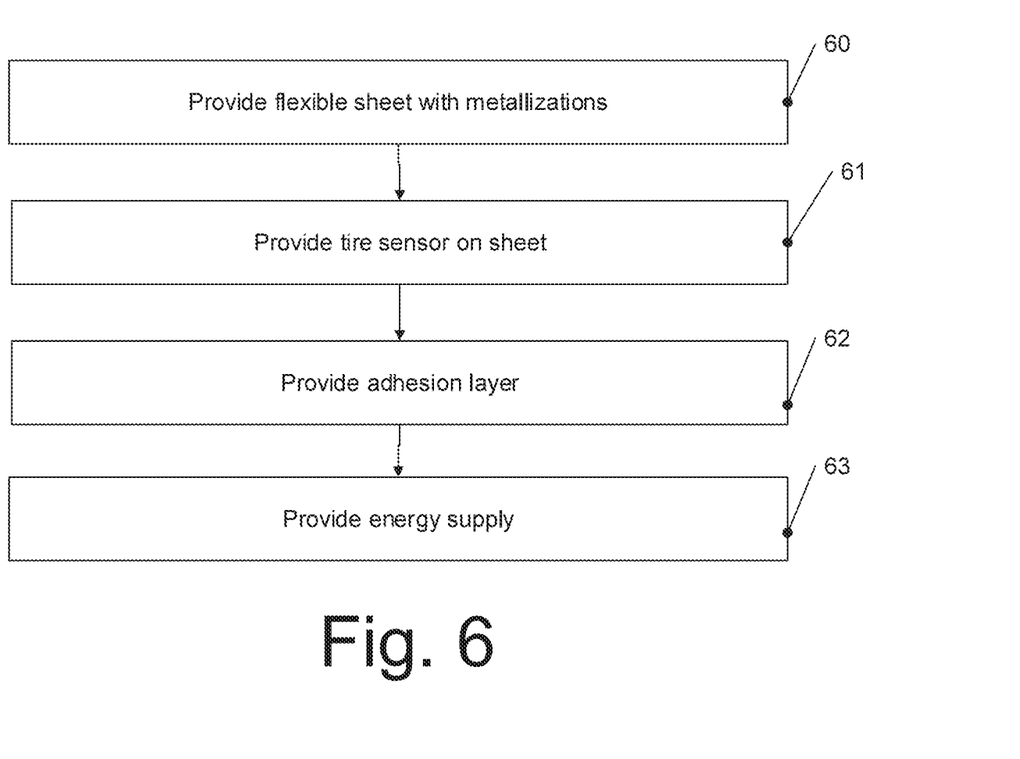
FIG. 6 is flowchart illustrating a method according to an embodiment.

FIG. 6 illustrates a method according to an embodiment, which may be used to provide sensor devices as discussed above. While the method of FIG. 6 is shown and described as a series of acts or events, the order in which these acts or events are presented and described is not to be construed as limiting.

At 60 in FIG. 6, a flexible sheet, for example a PET sheet, with metallizations or other conductive paths thereon is provided. At 61, one or more tire sensors are provided on the sheet and electrically coupled to the metallizations, for example by soldering. The tire sensors may comprise a pressure sensor, an acceleration sensor, a temperature sensor and/or a magnetic field sensor, but are not limited thereto.

Optionally, at 62 the method comprises providing an adhesion layer like a vulcanizable layer, in particular in case the flexible sheet is not suitable as an adhesion layer itself. At 63, the method comprises providing energy supply, for example a flexible sheet battery on or in the flexible sheet or a capacitor, as explained above. Furthermore, providing the energy supply may comprise providing the metallizations or other conductive paths on the flexible sheet as a coil for energy harvesting, as discussed above.

In view of the modifications and variations discussed, it is evident that the described embodiments serve as examples only and are not to be construed as limiting.

At least some embodiments are defined by the examples given below:

Example 1

A tire sensor device, comprising:
a flexible sheet, wherein conductive paths are formed on the flexible sheet,
a tire sensor chip mounted to the flexible sheet and electrically coupled to at least one of the conductive paths, and
an energy supply to electrically supply the tire sensor chip with energy.

Example 2

The tire sensor device of example 1, wherein the tire sensor chip comprises a pressure sensor.

Example 3

The device of example 2, wherein the flexible sheet comprises a gap, wherein the tire pressure sensor is mounted to the flexible sheet adjacent to said gap.

Example 4

The tire sensor device of example 1, wherein the at least one sensor chip comprises one or more of a magnetic field sensor, an acceleration sensor, a strain sensor, or a temperature sensor.

Example 5

The device of example 1, wherein the at least one sensor chip comprises at least one unpackaged chip.

Example 6

The device of example 1, wherein the device comprises a layer of vulcanizable material for mounting the sensor device to a tire.

Example 7

The device of example 1, wherein the flexible sheet has a size of at least 4 cm$^2$.

Example 8

The device of example 1, wherein the conductive paths comprise an antenna structure.

Example 9

The device of example 1, wherein the energy supply comprises a coil formed by said conductive paths to generate an electrical current by induction.

Example 10

The device of example 1, wherein the energy supply comprises a flexible sheet battery.

Example 11

The device of example 1, wherein the energy supply comprises an energy storage capacitor.

Example 12

A tire, comprising:
a tire sensor device of example 1 mounted inside the tire.

Example 13

The tire of example 12, wherein the tire comprises a plurality of tire sensor devices of example 1 mounted spaced apart along an inner circumference of the tire.

Example 14

A method, comprising:
providing a flexible sheet with conductive paths thereon,
providing a tire sensor chip on the sheet electrically coupled to the conductive paths, and
providing an energy supply electrically coupled to the conductive paths.

Example 15

The method of example 14, wherein providing the energy supply comprises providing a flexible sheet battery.

Example 16

The method of example 14, wherein the method is adapted to manufacture the tire sensor device of example 1.

The invention claimed is:

1. A tire sensor device, comprising:
a flexible sheet on which conductive paths are formed;
a tire sensor chip mounted to the flexible sheet and electrically coupled to at least one of the conductive paths; and
an energy supply comprising a flexible sheet battery to electrically supply the tire sensor chip with energy.

2. The tire sensor device of claim 1, wherein the tire sensor chip comprises a pressure sensor.

3. The device of claim 2, wherein the flexible sheet comprises a gap, and the tire pressure sensor is mounted to the flexible sheet adjacent to the gap.

4. The tire sensor device of claim 1, wherein the tire sensor chip comprises a magnetic field sensor, an acceleration sensor, a strain sensor, or a temperature sensor.

5. The device of claim 1, wherein the tire sensor chip comprises an unpackaged chip.

6. The device of claim 1, wherein the tire sensor device comprises a layer of vulcanizable material for mounting the tire sensor device to a tire.

7. The device of claim 1, wherein the flexible sheet has a size of at least 4 $cm^2$.

8. The device of claim 1, wherein the conductive paths comprise an antenna structure.

9. The device of claim 1, wherein the energy supply comprises a coil formed by the conductive paths to generate an electrical current by induction.

10. The device of claim 1, wherein the energy supply comprises an energy storage capacitor.

11. The device of claim 1, wherein the flexible sheet battery is comprised in the flexible sheet.

12. The device of claim 11, wherein the flexible sheet battery is surrounded by non-conducting flexible material of the flexible sheet.

13. A tire, comprising:
a tire sensor device mounted inside the tire, and comprising:
a flexible sheet on which conductive paths are formed;
a tire sensor chip mounted to the flexible sheet and electrically coupled to at least one of the conductive paths, and
an energy supply comprising a flexible sheet battery comprised in the flexible sheet and to electrically supply the tire sensor chip with energy.

14. The tire of claim 13, wherein the tire comprises a plurality of the tire sensor devices mounted spaced apart along an inner circumference of the tire.

15. A method of manufacturing a tire sensor device, comprising:
providing a flexible sheet with conductive paths thereon;
providing a tire sensor chip on the flexible sheet electrically coupled to the conductive paths; and
providing an energy supply comprising a flexible sheet battery electrically coupled to the conductive paths.

16. The method of claim 15, wherein the providing the energy supply comprises providing a flexible sheet battery.

* * * * *